United States Patent
Bhayana et al.

(10) Patent No.: US 7,509,461 B1
(45) Date of Patent: Mar. 24, 2009

(54) METHOD AND APPARATUS FOR INTELLIGENT BUFFER CACHE PRE-EMPTION

(75) Inventors: Deepika Bhayana, South Grafton, MA (US); Jean-Pierre Bono, Westboro, MA (US)

(73) Assignee: EMC Corporation, Hopkinton, MA (US)

( * ) Notice: Subject to any disclaimer, the term of this patent is extended or adjusted under 35 U.S.C. 154(b) by 288 days.

(21) Appl. No.: 11/427,526

(22) Filed: Jun. 29, 2006

(51) Int. Cl.
*G06F 12/08* (2006.01)

(52) U.S. Cl. .................. 711/144; 711/145; 711/170; 711/207

(58) Field of Classification Search .............. 711/144, 711/145, 156, 170, 129, 173, 206, 207, 113, 711/118; 707/100
See application file for complete search history.

(56) References Cited

U.S. PATENT DOCUMENTS

| | | | | |
|---|---|---|---|---|
| 5,696,927 A | * | 12/1997 | MacDonald et al. | 711/207 |
| 6,633,967 B1 | * | 10/2003 | Duncan | 711/207 |
| 7,272,376 B1 | * | 9/2007 | Sparr et al. | 370/335 |
| 7,353,361 B2 | * | 4/2008 | Hepkin et al. | 711/203 |
| 2006/0277389 A1 | * | 12/2006 | Hepkin et al. | 711/203 |

FOREIGN PATENT DOCUMENTS

FR       EP0251861 A1 *  1/1988

* cited by examiner

*Primary Examiner*—Pierre-Michel Bataille
(74) *Attorney, Agent, or Firm*—Krishnendu Gupta; Robert Kevin Perkins (57) ABSTRACT

The present invention augments each entry in a memory frame table to include information associated with the availability of any page that is buffer cache allocated. The availability information may include, for example, a link to a buffer cache descriptor associated with a buffer cache allocated page. Alternatively, the availability information may include a use status of the buffer cache allocated page. During a consecutive multi-page allocation process, pages which are buffer cache allocated are checked for availability. Should a buffer cache allocated page be available for use, it is intelligently pre-empted by the allocation process. By providing a mechanism to readily determine buffer cache page availability, a multi-page allocation process with increased efficiency may make intelligent decisions about the appropriateness of buffer cache page pre-emption.

9 Claims, 5 Drawing Sheets

| F 0 | F 1 | B 2 | O | F | F | F | F | B |
|---|---|---|---|---|---|---|---|---|
| F | F | O | O | O | O | F | F | F |
| F | F | B | F 3 | O 4 | B | B | F | F |
| B | F | F | F | O | O | O | F | F |
| O | B | O | F | B | B | F | F | F |
| F 5 | F 6 | F 7 | F | F | F | F | B | F |

PRIOR ART

METHOD AND APPARATUS FOR INTELLIGENT BUFFER CACHE PRE-EMPTION

FIELD OF THE INVENTION

This invention relates generally to the disk array storage technology and more particularly to a method and system for identifying contiguous pages for use by an allocation process.

BACKGROUND OF THE INVENTION

Network-attached storage (NAS) systems are generally computing-storage devices that can be accessed over a computer network, rather than being directly connected to the computer (via a computer bus). NAS systems enable multiple users to share the same storage space at once, and often minimize overhead by centrally managing hard disks. An operating system, executing on a NAS file server, controls the allocation of memory to coupled clients. Allocation is generally performed at a page granularity, where a page is a selected number of contiguous blocks. The particular size of a page is typically a function of the operating system, for example in the Data Access in Real time (DART) operating system of EMC Corporation, Hopkinton Mass., and the page size is 8K bytes.

To the operating system, the file system is a collection of 8 k blocks. As the file server is initialized, some of the pages are reserved for use by the operating system, some pages are designated as 'free' for allocation to other applications, and a large chunk of pages are reserved to provide a buffer cache. The buffer cache temporarily stores pages that are also stored in an attached disk device to increase application performance. File system accesses may be serviced from the buffer cache rather than read from the disk, thereby saving the delay associated with I/O disk access and increasing file server performance.

One of the functions of the file server operating system is to allocate pages to applications. The operating system maintains a 'free list', which is a list of pages that are available for allocation to applications. When an application requires one or more pages, the operating system may allocate a page from either the free list or the buffer cache. When client applications no longer need pages, they are returned to the free list. Because of the way that pages are added and removed from the free list, consecutive entries of the free list do not generally point to consecutive pages in memory.

The performance of applications is heavily influenced by the speed with which an application can retrieve data. As such, it is important to allocate pages to applications in an intelligent manner. For example, when applications require multiple pages for operation, it is desirable that the pages that are allocated to the application are contiguous in memory since data can be accessed from contiguous memory locations much more quickly. Because the free list can not be relied upon to provide contiguous pages, a different mechanism must be used for identifying contiguous pages of memory for allocation to applications.

Figure 1:
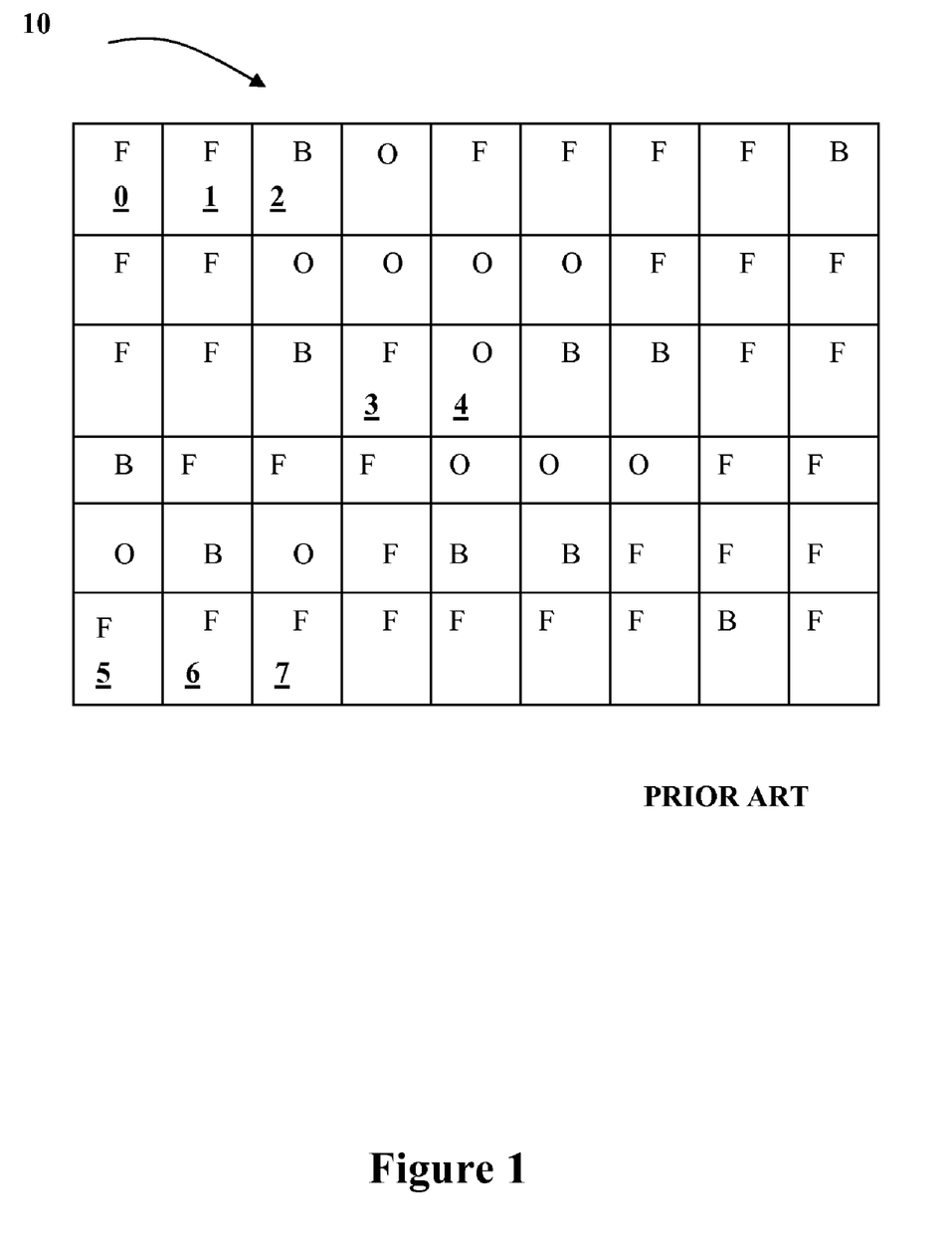
FIG. 1 is a diagram illustrating a frame table having ownership information that is used to describe a prior art multi-page allocation process.

One mechanism that is often used to identify contiguous pages in memory is a frame table, such as that shown in FIG. 1. A frame table stores an indication of the 'ownership' of each page of memory. Several exemplary indications are shown in FIG. 1. The indication may be that the page is 'free' (indicated by an F in FIG. 1), or that the page is in owned by the file system or by an existing application (indicated by an O in FIG. 1), or that the page has been allocated to the buffer cache (indicated by a B in FIG. 1).

Historically the frame table has been used to locate contiguous pages in the following manner. For example, as shown in FIG. 1, assume that a multiple page allocation process is seeking to identify three contiguous pages in memory to allocate to an application. First an initial free page is retrieved from the free list. In the example of FIG. 1, assume that page 0 is identified as a free page by the free list. Using the frame table, the multi-page allocation process checks the ownership status of the next consecutive page in memory, page 1 in the example of FIG. 1. The ownership bit of page 1 is also free. The multi-page allocation process then checks the ownership of the third consecutive page in memory, page 2. Unfortunately, the ownership bit in the frame table indicates that page 2 is allocated to the buffer cache (B).

Because the consecutive frame table entries (0, 1 and 2) associated with the page retrieved from the free list indicate that the memory pages will not satisfy the multi-page allocation request, the free list is again accessed to locate a different free page, to begin a consecutive free page search. In the example of FIG. 1, page 3 is retrieved from the free list, and the process next checks the ownership status of page 4. Because page 4 is in use, the process returns to the free list to retrieve another free page. In the example of FIG. 1, page 5 is returned from the free list. The multi-page allocation process checks the ownership status of page 6 and 7. Having located three consecutive free pages, the process can then allocate the application to these pages.

Although the above process may successfully identify multiple consecutive pages, the non-deterministic nature of the process makes it inefficient and time consuming. In addition, it may be eventually determined that there are not enough free consecutive pages to satisfy an allocation request. A typical solution to such a problem is to restart the allocation procedure and pre-empt, or effectively 'steal' the first buffer cache page identified in the frame table; effectively 'swapping' the page from the buffer cache to the 'free list.' Such blind pre-emption of buffer cache pages, however, may cause delay to an application that is using the pre-empted buffer cache page, and thrashing can occur. It would be desirable to identify an improved multi-page allocation method which overcomes the problems of the prior art.

SUMMARY OF THE INVENTION

According to one aspect of the invention, each frame table entry is augmented to include a link to a buffer cache descriptor for that page. The link to the buffer cache descriptor is valid when the page is a buffer cache page. The buffer cache descriptor includes status information associated with the buffer cache page where the status information indicates whether the page is in use by an application or whether the page is available.

When the frame table is accessed during a multi-page allocation process of the present invention, the ownership indicator is evaluated to determine whether the page is a buffer cache allocated page. If the page is a buffer cache page, the allocation process uses the link provided in the frame table entry for the page to access the buffer cache descriptor for the page. The allocation process evaluates the status information provided in the buffer cache descriptor to determine whether the page is available for pre-emption. If the buffer cache page is available for pre-emption, the allocation process may pre-empt the buffer cache page, removing that page from the buffer cache and placing it on the free list.

Providing links to the buffer cache descriptors of buffer cache pages increases the quality of the page allocation process while decreasing allocation complexity. Application performance is improved because thrashing caused by blind pre-emption of buffer cache pages is eliminated. An organized frame table search process takes advantage of buffer cache descriptor information to intelligently pre-empt buffer cache pages, thereby allowing application pages to be more tightly compacted in memory and removing the random distribution of application pages through memory and concomitantly increasing file server performance.

According to another aspect of the invention, a frame table including the buffer descriptor link of the present invention is advantageously used in a deterministic multi-page allocation process that performs both a forward and reverse search for available pages in the frame table, thereby increasing the efficiency of the allocation process by more intelligently evaluating surrounding pages for availability.

These and other aspects of the invention will now be shown and described with regard to the below figures.

DETAILED DESCRIPTION

Figure 2:
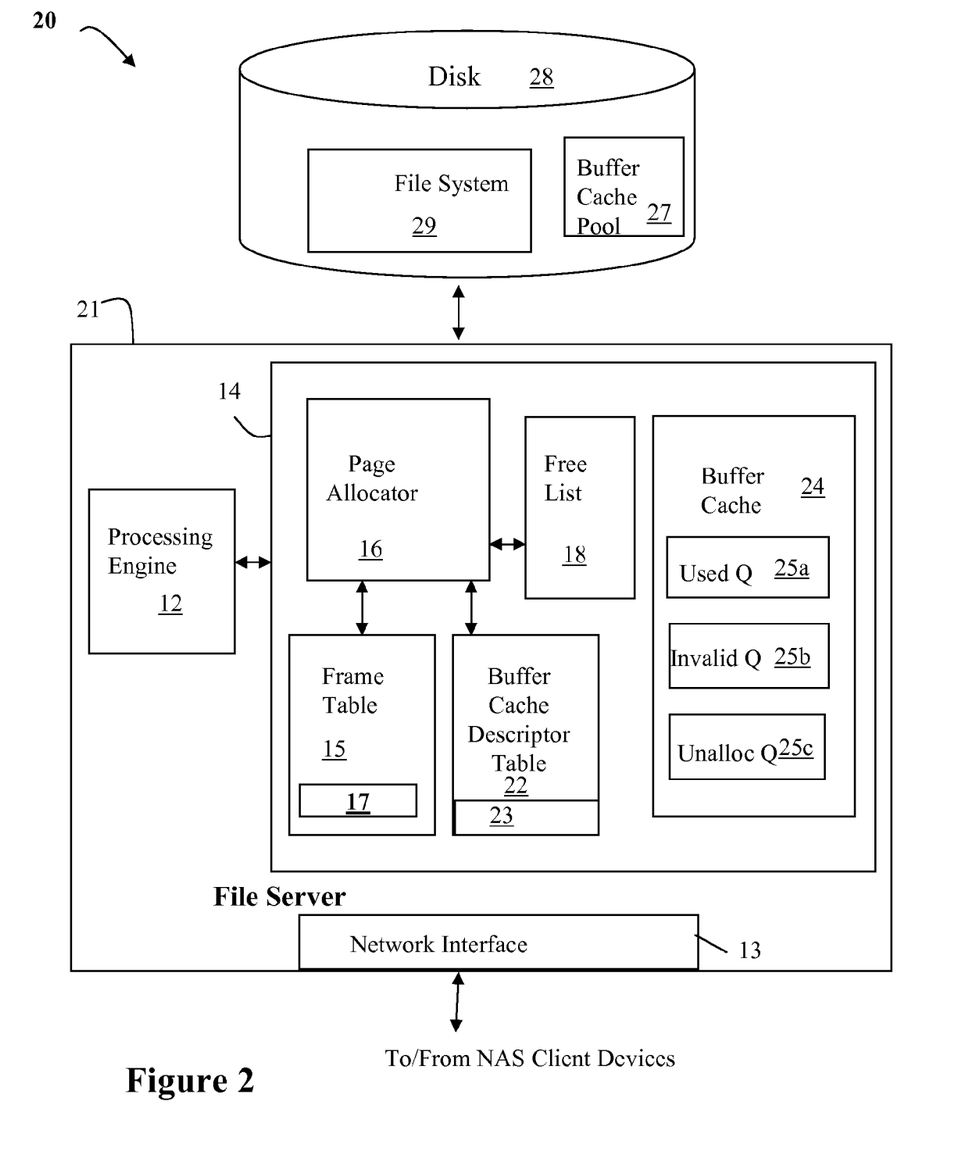
FIG. 2 is a block diagram of a file server coupled to a file system having pages that may be allocated using the augmented frame table of the present invention.

Referring now to FIG. 2, a block diagram of a Network Attached Storage (NAS) system 20 is shown to include a file server 21 coupled to a primary storage device 28. The storage device 28 may be, for example, a disk array that incorporates a file system 29. The file system 29 is generally a data structure that translates the physical (sector) view of a disc into a logical (files, directories) structure, which helps both computers and users locate files. In other words, it records where files and directories are located on the disc.

The storage device is apportioned into fixed size frames, or pages, for organizational purposes. The terms 'frame' and 'page' will be used interchangeably herein. Each operating system allocates a defined number of data blocks to each page. For example, the DART operating system used by EMC Corporation of Hopkinton Mass. in the Celerra NAS systems apportions memory into pages of 8K bytes.

The storage device can therefore be viewed as an array of pages. A first portion of the pages are allocated to one or more file systems such as file system 29 and other data structures that are used to support the operating system of the file server. A second portion of the pages are allocated to a buffer cache pool 27, where the buffer cache pool 27 comprises a collection of pages which are replicated in the file server to improve file server access. The remaining pages are so-called 'free' pages available for allocation to applications. The file server 21 communicates with clients coupled to the file server by a local area network (LAN) via network interface 13. Clients execute applications which access storage via the file server.

The file server 21 includes several components that are used to allocate pages from the free list to applications. The components may be implemented as software routines, hardware, or a combination thereof. For example, the allocation process is generally one routine implemented by the file server operating system. In FIG. 2, the components that support page allocation are shown to include a page allocator 16, a free list 18 and a frame table 15. The page allocator 16 is a software routine that allocates pages of memory to applications. An application may require one or more pages of memory. Application performance is optimized by allocating contiguous pages to an application that utilizes more than one page. A multi-page allocation process of the present invention seeks to identify contiguous available pages using the free list 18 and the frame table 15.

The free list 18 is a list of pages that are available for allocation to applications. The free list may be implemented as a linked list that connects unallocated pages of memory together, using the first word of each unallocated region as a pointer to the next unallocated region. Successive locations in a free list do not necessarily identify consecutive memory pages, so the free list cannot be used to provide multiple consecutive memory pages when an application uses more than one page. Rather, the frame table 15 is used to identify which pages in the memory are owned, and which are available for allocation to applications.

Figure 3A:
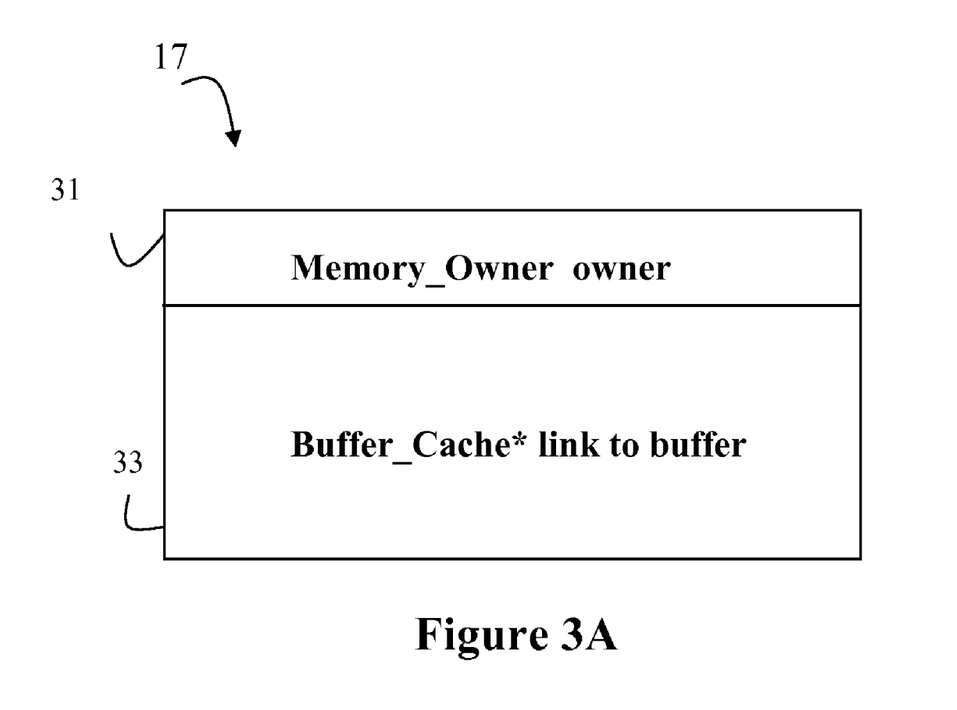
FIG. 3A illustrates exemplary fields of a frame table entry of the present invention.

The frame table 15 comprises an array of frame table entries, such as entry 17. Each frame table entry corresponds to one page in memory. FIG. 3A illustrates an exemplary frame table entry 17. The frame table includes an ownership field 31, identifying the owner of the page in memory. According to one aspect of the invention, each frame table entry 17 also includes a buffer cache descriptor link 33 associated with page corresponding to the frame table entry. How this buffer cache descriptor link 33 is used in a multi-page allocation process of the present invention will be described in further detail below.

Referring back to FIG. 2, the buffer cache descriptor link 33 points to an entry 23 in a buffer cache descriptor table 22. The buffer cache descriptor table 22 includes an entry 23 for each page of a buffer cache 24, and includes information about the buffer cache page. The information may include the physical address of the buffer cache page, as well as an identifier of a buffer cache queue to which the page is allocated. In one implementation, the buffer cache comprises three queues, a Used Queue 25a, an Invalid Queue 25b and an Unalloc Queue 25c. Although exemplary queues are shown, there is not requirement that any particular queue is provided with the buffer cache. Rather it is appreciated that any number and variety of queues may be provided with the buffer cache, which each queue being associated with a buffer cache entry having a different availability status, ranging from free for pre-emption to unavailable for pre-emption.

Figure 3B:
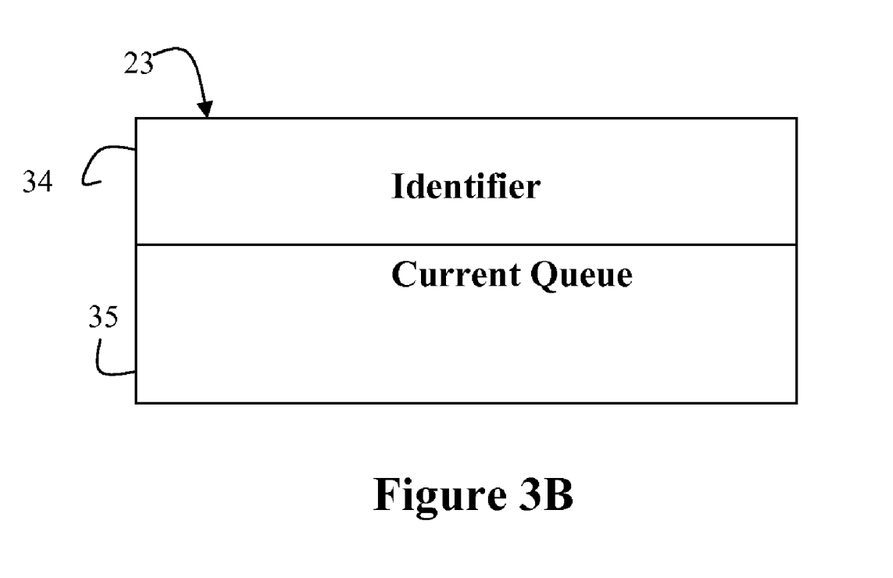
FIG. 3B illustrates exemplary fields that may be included in a buffer descriptor linked to by the frame table entry of FIG. 3A.

FIG. 3B illustrates two of several fields that are included in each buffer cache descriptor entry 23. It should be appreciated that while certain buffer cache availability states (such as Invalid, Unalloc, Used, etc.,) are provided by way of example, any availability status could be substituted herein. In FIG. 3B, the buffer cache descriptor entry includes a page identifier 34 and a current queue field 35. In the embodiment of FIG. 3B, it is shown that the values of the current queue field 35 indicate whether the associated buffer cache page is in the Unalloc, Invalid or Used queues. Even though a page is buffer cache allocated, any buffer cache page that is in the Invalid queue is essentially 'free' for allocation to an application.

According to one aspect of the invention it is realized that the buffer cache descriptor information may be used to assist a multi-page allocation process by providing enhanced knowledge regarding the status of buffer cache allocated pages. Thus, in a preferred embodiment of the invention, a buffer cache descriptor link is provided in each frame table entry. When a multi-page allocation process attempts to locate consecutive memory pages and identifies a buffer cache allocated page, the buffer cache descriptor is accessed to determine if the buffer cache allocated page is in fact available for allocation to the application. For example, a new function that checks buffer cache descriptor status may be included in the multi-page allocation scheme. In a preferred embodiment, a link to the buffer cache descriptor is stored with each frame table entry, for ease of retrieval of the buffer cache descriptor information. At initialization, all of the buffer cache descriptor links in the frame table are initialized to NULL. When a page is mapped to the buffer cache, the buffer cache descriptor link in the frame table is updated to point to the corresponding buffer cache descriptor entry. In an alternate embodiment, the buffer cache descriptor information may be stored directly in the frame table, although such a solution is less preferable due to the added complexity of maintaining consistency between the buffer cache descriptor table and the frame table.

Figure 4:
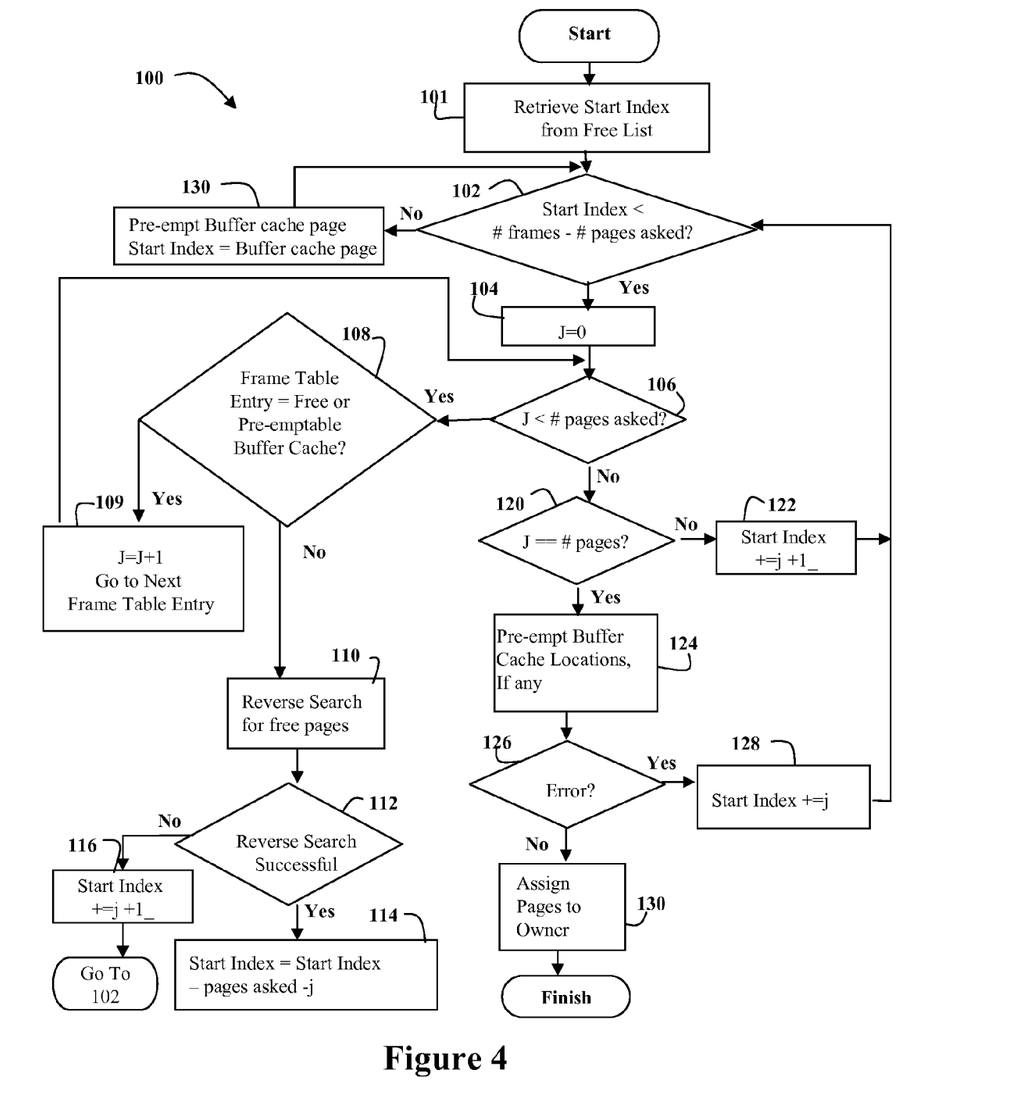
FIG. 4 is a flow diagram illustrating exemplary steps that may be performed in a multi-page allocation process that uses the buffer descriptor link in the frame table entry of FIG. 3A to intelligently pre-empt buffer cache pages.

FIG. 4 is a flow diagram which illustrates exemplary steps that may be taken in a multi-page allocation process that uses the buffer cache descriptor information provided in a frame table of the present invention to pre-empt buffer cache locations. At step 101, a starting index to the frame table is retrieved from the free list 18. At step 102, it is determined whether there are sufficient 'free' frames in memory to satisfy the allocation request. If there are, the process proceeds to step 104, where a page counter (J) is set equal to zero. At step 106 it is determined whether the search for contiguous pages is completed by comparing the page counter J to the # of pages asked for. If the search is not completed, the process proceeds to step 108, where the ownership information 31 of the frame table entry 17 is checked to see if the page is 'free' or whether it is a pre-emptable buffer cache page. The page is a pre-emptable buffer cache page is the ownership information is 'buffer cache' and an execution of a function retrieving buffer cache descriptor information for the entry indicates that the page is in the invalid queue. If the page is free of if it is a pre-emptable buffer cache page, then the process proceeds to step 109, where the counter and index are incremented, and the next successive page is evaluated.

If, at step 108 it was determined that the next successive page was not free, or not a pre-emptable buffer cache location, then at step 110 a reverse search is performed. The reverse search evaluates pages that precede the starting index to identify free pages. Thus, in a manner similar to steps 108 and 109, the ownership and pre-emptability of each page is evaluated, the index decremented and the counter is incremented until it is determined at step 112 whether the reverse search was successful (i.e., all pages were collected).

If the reverse search is not successful, then the entire area surrounding the starting index has been evaluated and determined not to satisfy the allocation request. At step 116, the starting index is set equal to the next succeeding frame table entry after the entry which failed to satisfy the request, and the process returns to step 102. Thus the multi-page allocation process of the present invention take a deterministic, orderly step through the frame table starting at a given index of the frame table until it is determined at step 120 that a consecutive group of pages has been located that satisfies the allocation request. When the pages have been identified, at step 124 the process attempts to pre-empt the buffers. If there is an error during pre-emption, then the process skips to the next successive frame table entry and returns to step 102. Otherwise, the identified pages are allocated, or assigned to the application, and the ownership status in the frame table is updated to reflect the owned status of the page.

If, either at step 102 or during the allocation process it is determined that there are not enough free pages to satisfy the allocation request, only then at step 130 is a buffer cache location pre-empted. Buffer cache pre-emption in the present invention is not blind; rather, the buffer cache descriptor information available to the frame table is used to make an intelligent selection of a pre-emptable buffer cache page.

Figure 5:
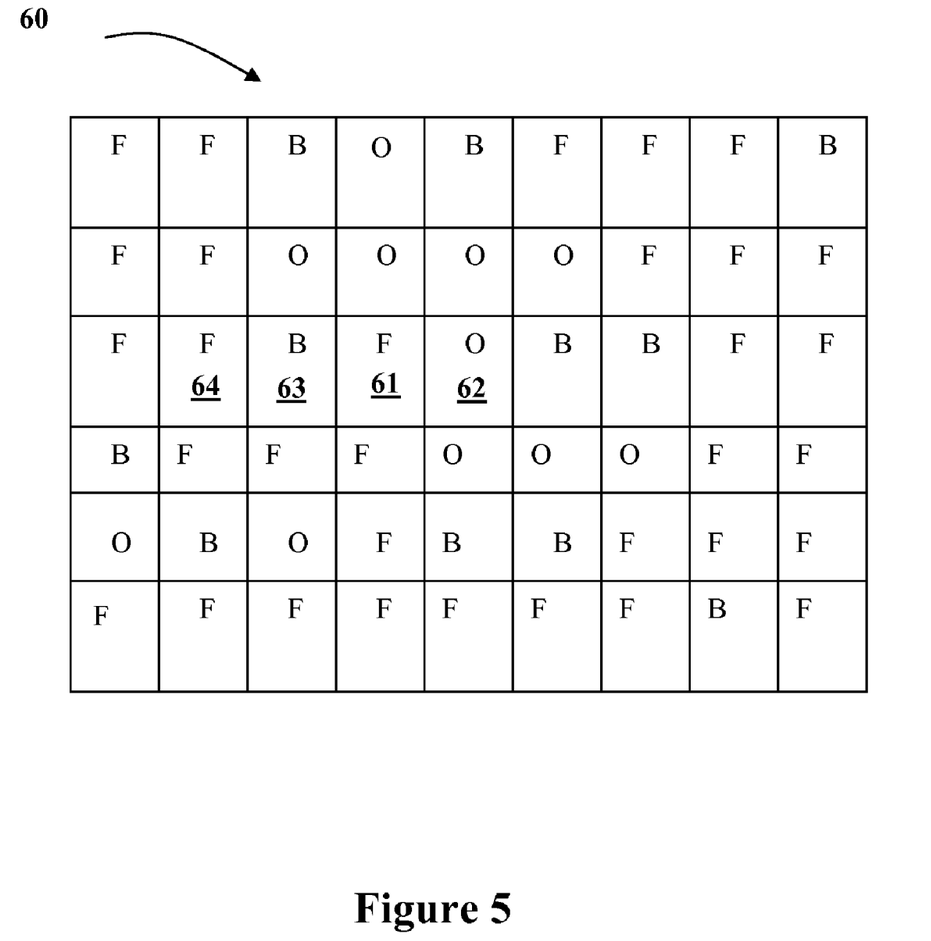
FIG. 5 is a diagram of a frame table of the present invention, which is used to describe an example allocation performed by the multi-page allocation process of FIG. 4.

The multi-page allocation process of the present invention will now be described with reference to the frame table 60 of FIG. 5. Assume that an application requires three contiguous pages in memory, and that the buffer cache is full. A start index is retrieved from the free list that indexes the table at frame table entry 61. The frame table entry ownership field indicates that the frame is free for allocation, so the counter is incremented, and the index is incremented to point to frame entry 62. However, the page associated with frame table entry 62 is Owned, perhaps by the file system or another client application file. Thus, the process then looks at the page preceding the starting index, frame table entry 63. Frame table entry 63 is associated with a page that is owned by the buffer cache. However, when buffer cache descriptor is accessed using a link included in the frame table entry 63, it is determined that the buffer cache page is in the Invalid queue, and is therefore available for use. The process then examines the next preceding entry, frame table entry 64. Frame table entry 64 indicates that the frame is 'free' for allocation. Thus, the required number of pages has been located, and the pages are allocated to the application.

Accordingly a method and apparatus has been shown and described that allows buffer cache pages to be intelligently pre-empted during a multi-page allocation process. By providing a mechanism within the frame table that allows the allocation process to quickly identify whether reserved buffer cache pages are available for use, intelligent pre-emption may be performed and incidences of thrashing will be reduced. The sequential page allocation process of the present invention, which utilizes buffer descriptor information, is less complex and provides improved results over the prior art by allocating pages in a more compact manner. By allocating pages in a more compact manner file server performance is improved.

It should be noted that although the present invention has been described with reference to buffer cache entry pre-emption, the present invention is not limited to use with buffer caches. Rather, it is envisioned that the present invention may be adapted to enable intelligent pre-emption of any type of memory by making page descriptor information readily available to the page pre-emption logic.

Having described various embodiments of the invention, it will be appreciated that many of the above figures are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem The above description and figures have included various process steps and components that are illustrative of operations that are performed by the present invention. However, although certain components and steps have been described, it is understood that the descriptions are representative only, other functional delineations or additional steps and components can be added by one of skill in the art, and thus the present invention should not be limited to the specific embodiments disclosed. In addition it is understood that the various representational elements may be implemented in hardware, software running on a computer, or a combination thereof.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

The invention claimed is:

1. A method of locating a number of consecutive pages in a memory for allocation to an application, wherein at least a portion of the memory is reserved as a buffer cache pool and wherein the memory is apportioned into a plurality of pages comprises the step of:

performing a search of a frame table to locate the number of consecutive pages, wherein the frame table is a data structure that includes an entry for each page of memory, each entry including ownership information including information indicating whether the corresponding page is free or is buffer cache allocated, wherein the step of searching includes the step of changing the ownership information of a page from buffer cache allocated to free responsive to buffer cache availability information associated with the page indicating that the page is available for use; and wherein the step of performing a search of the frame table comprises the steps of:

a) identifying a starting index to the frame table;

b) using the starting index, accessing an entry in a frame table and retrieving the ownership information of the entry;

c) responsive to the ownership information indicating that a page associated with the entry is free, allocating the page to the application;

d) responsive to the ownership information indicating that the page associated with the entry is buffer cache allocated:

retrieving availability information for the page; and responsive to the availability information of the page indicating that the page is available, allocating the page to the application.

2. The method of claim 1, further including the steps of:

e) incrementing the starting index provide to retrieve the next successive frame table entry; and repeating steps b-e using the incremented starting index until the number of consecutive pages are located or until the availability information of the page associated with the incremented starting index indicates that the page is unavailable.

3. The method of claim 2, further including the step of, responsive to the availability information of the page associated with the incremented starting index indicating that the page is unavailable:

f) decrementing the starting index to retrieve the next preceding frame table entry; and repeating steps b-d and f using the decremented starting index until the number of consecutive pages are located or until the availability information of the page associated with the decremented starting index indicates that the page is unavailable.

4. The method of step 3, further including the step of, responsive to the availability information of the page associated with the decremented starting index indicating that the page is unavailable, updating the starting index, and returning to step b.

5. The method of claim 1 wherein the starting index is identified by retrieving a next free page from a list of free pages of memory.

6. The method of claim 4 wherein the starting index is updated by retrieving a next free page from a list of free pages of memory.

7. The method of claim 1, wherein the step of retrieving availability information for the buffer cache allocated page includes the step of accessing a buffer cache descriptor table using a buffer cache descriptor link stored in the entry of the frame table.

8. The method of claim 1, wherein the step of retrieving availability information for the buffer cache allocated page includes the step of retrieving the availability information from the entry of the frame table.

9. In a file server including a computer readable medium, program code, stored on the computer readable medium, operable when executed to locate a number of consecutive pages in a memory coupled to the file server for allocation to an application, wherein at least a portion of the memory is reserved as a buffer cache pool and wherein the memory is apportioned into a plurality of pages, the program code including:

program code operable when executed to perform a search a frame table to locate the number of consecutive pages, wherein the frame table is a data structure that includes an entry for each page of the memory, each entry including ownership information including information indicating whether the corresponding page is free or is buffer cache allocated, wherein the program code includes program code for changing the ownership information of a page from buffer cache allocated to free responsive to buffer cache availability information associated with the page indicating that the page is available for use; and wherein the program code that performs a search of the frame table includes:

a) program code operable when executed to identify a starting index to the frame table;

b) program code that uses the starting index and is operable when executed to access an entry in a frame table and retrieving the ownership information of the entry;

c) program code, responsive to the ownership information indicating that a page associated with the entry is free, for allocating the page to the application;

d) program code, responsive to the ownership information indicating that the page associated with the entry is buffer cache allocated to:

retrieve availability information for the page; and responsive to the availability information of the page indicating that the page is available, allocate the page to the application.

* * * * *